United States Patent
Kwon et al.

(10) Patent No.: US 6,882,791 B2
(45) Date of Patent: *Apr. 19, 2005

(54) PACKAGING UNIT FOR OPTICAL FIBER ARRAY

(75) Inventors: Oh-Dal Kwon, Suwon-shi (KR); Seung-Wan Lee, Suwon-Shi (KR); Bang-Weon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 219 days.

This patent is subject to a terminal disclaimer.

(21) Appl. No.: 10/091,900

(22) Filed: Mar. 6, 2002

(65) Prior Publication Data

US 2002/0197048 A1 Dec. 26, 2002

(30) Foreign Application Priority Data

Jun. 23, 2001 (KR) .......................................... 2001-36002

(51) Int. Cl.⁷ ................................................. G02B 6/00
(52) U.S. Cl. ..................... 385/138; 385/49; 385/137; 385/139; 385/114; 385/86; 385/87
(58) Field of Search ....................... 385/138, 49, 88–89, 385/92, 94, 14, 86, 87, 136–137, 139, 134; 219/530, 209, 385

(56) References Cited

U.S. PATENT DOCUMENTS 5,994,679 A * 11/1999 DeVeau et al. ............. 219/530

* cited by examiner

*Primary Examiner*—Brian Healy
*Assistant Examiner*—Michael P. Mooney
(74) *Attorney, Agent, or Firm*—Cha & Reiter, L.L.C.

(57) ABSTRACT

There is provided a packaging unit for an optical fiber array using a planar lightwave circuit (PLC). An optical fiber array is fixed within a housing. The housing has first and second slots formed to face each other on the side periphery, and each of the first and second slots has opened ends to make the inner and outer walls of the housing communicate with each other. An optical fiber of the optical fiber array is inserted through first and second boots and then the first and second boots are inserted in the first and second slots of the housing.

17 Claims, 9 Drawing Sheets

PACKAGING UNIT FOR OPTICAL FIBER ARRAY

CLAIM OF PRIORITY

This application makes reference to and claims all benefits accruing under 35 U.S.C. Section 119 from an application entitled "Packaging Unit for Optical Fiber Array" filed in the Korean Industrial Property Office on Jun. 23, 2001 and there duly assigned Serial No. 2001-36002.

BACKGROUND OF THE INVENTION

1. Field of the Invention

The present invention relates generally to an optical fiber array. More particularly, the present invention relates to a packaging unit for an optical fiber array.

2. Description of the Related Art

In general, optical communication devices utilizing PLC (Planar Lightwave Circuitry) include Arrayed Waveguide Gratings (AWGs), MUXs/DEMUXs, splitters, etc. Waveguide designing, alignment and packaging of these optical devices are significant technological factors involved in the manufacture of communication modules.

Traditionally, an optical fiber array with PLC is secured by a boot, of which the upper and lower parts are combined with a housing by means of a fastener.

FIGS. 1 and 2 illustrate conventional optical fiber array fixing structures for a single fiber and a ribbon fiber, respectively. Both fixing structures utilize fasteners.

Referring to FIG. 1, V-grooves 16 and 18 are formed in the opposing surfaces of the upper and lower parts 10 and 12 of a boot in order to align fixedly a single fiber 14. After the alignment of the single fiber 14 in the space defined by V-grooves 16 and 18 of the boot, the upper and lower parts 10 and 12 of the boot are combined by a fastener like a bolt, a screw, or a plate spring. This boot is attached to a PLC using an adhesive and then physically contained in a housing (not shown). Arrows shown in FIG. 1 designate the direction of force applied to the boot by the fastener.

Referring to FIG. 2, grooves 26 and 28 are formed into the facing surfaces of the upper and lower parts 20 and 22 of a boot in order to align a ribbon fiber 24. After alignment of the ribbon fiber 14 in the V-grooves 26 and 28 of the boot, the upper and lower parts 20 and 22 of the boot are combined by a fastener like a bolt, a screw, or a plate spring. This boot is attached to a PLC using an adhesive and then physically arranged within a housing (not shown). Arrows shown in FIG. 2 designate the direction of force applied to the boot by the fastener.

In the above packaging mechanisms, however, pressure resulting from strong fastening force applied to the upper and lower parts of the boots may damage the optical fiber or ribbon fiber and/or change its optical characteristics. On the other hand, if the pressure is reduced to minimize the damage to the fibers, the force with which the boots fasten the fibers is decreased, thereby deteriorating module performance.

Referring to FIG. 3, the upper and lower parts 30 and 32 of a boot are combined by using a UV-curable epoxy resin 36 instead of a fastener. After a ribbon fiber 34 is placed in grooves, the epoxy resin 36 is filled in the remainder of the grooves and then cured by radiation of UV light 38 in the direction indicated by arrows in FIG. 3. Thus, the upper and lower parts 30 and 32 of the boot are combined.

Fixing a fiber to a boot using an adhesive such as a UV-curable epoxy resin, however, makes a manufacture process complicated, requires lots of material, and increases manufacture cost.

SUMMARY OF THE INVENTION

The present invention relates to a packaging unit for an optical fiber array that fixes the optical fiber array in a housing without damage caused by the pressure applied to the upper and lower parts of a boot.

It is another aspect of the present invention to provide a packaging unit for an optical fiber array that is assembled readily, thereby saving costs.

The foregoing and other objects of the present invention are achieved by providing a packaging unit for an optical fiber array having a planar lightwave circuit (PLC). An optical fiber array is fixed within a housing. The housing has first and second slots formed to face each other on the side periphery, and each of the first and second slots has open ends to make the inner and outer walls of the housing communicate with each other. An optical fiber of the optical fiber array is inserted through first and second boots and then the first and second boots are inserted in the first and second slots of the housing.

According to a first embodiment of the present invention, a packaging unit for an optical fiber array having a planar lightwave circuit (PLC), comprises:

an optical fiber array;

a housing having peripheral sides with inner and outer side walls, said optical fiber array being fixed in said housing, and said housing having first and second slots formed on respective peripheral sides so as to face each other, each of the first and second slots having open ends so that the inner and outer side walls of the housing are in communication with each other; and first and second boots inserted in the first and second slots, respectively, wherein an optical fiber of the optical fiber array is inserted through the first and second boots, to fix the optical fiber lengthwise.

The first boot can be sized to receive a single optical fiber, and has a cylindrical portion secured in the first slot, a conical portion extended from the cylindrical portion and positioned outside the housing, an opening formed along the center of the cylindrical and conical portions in the length direction, for receiving the single fiber, and an engaging portion extended perpendicularly from the cylindrical portion. The first boot can be sized to receive no more than a single optical fiber.

The second boot can be sized to receive a ribbon optical fiber, the second boot having a planar portion secured in the second slot, a tapered portion extended from the planar portion and positioned outside the housing, an opening formed along the center of the planar and tapered portions in the length direction, for receiving the ribbon fiber, and an engaging portion extended perpendicularly from the planar portion.

The optical fiber array may include a Planar Lightwave Circuitry (PLC) chip, and an input fiber block at an input side of the PLC chip, and an output fiber block at an output side of the PLC chip. The optical fiber array can be fixed in the housing with an adhesive.

The first and second boots can be affixed in their respective slots with an adhesive. The first and second slots can be sized to retain the first and second boots.

The first and second boots may have respective engaging portions, each respective engaging portion being arranged substantially perpendicular to a lengthwise direction of the respective first and second boots.

The respective first and second slots each may have a portion substantially perpendicular to a lengthwise direction of the first and second boots to receive the respective engaging portion of the respective first and second boots.

According to yet another embodiment, a method of the present invention may comprise: A method for housing an optical fiber array in a packaging unit, said method comprising the steps of:

(a) forming a housing having peripheral sides with inner and outer side walls so as to hold the optical fiber array in said housing, and said housing having first and second slots formed on respective peripheral sides so as to face each other, each of the first and second slots having open ends so that the inner and outer side walls of the housing are in communication with each other;

(b) arranging an optical fiber array in said housing; and (c) inserting the first and second boots in the first and second slots, respectively, wherein an optical fiber is inserted through the first and second boots, to fix the optical fiber lengthwise.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
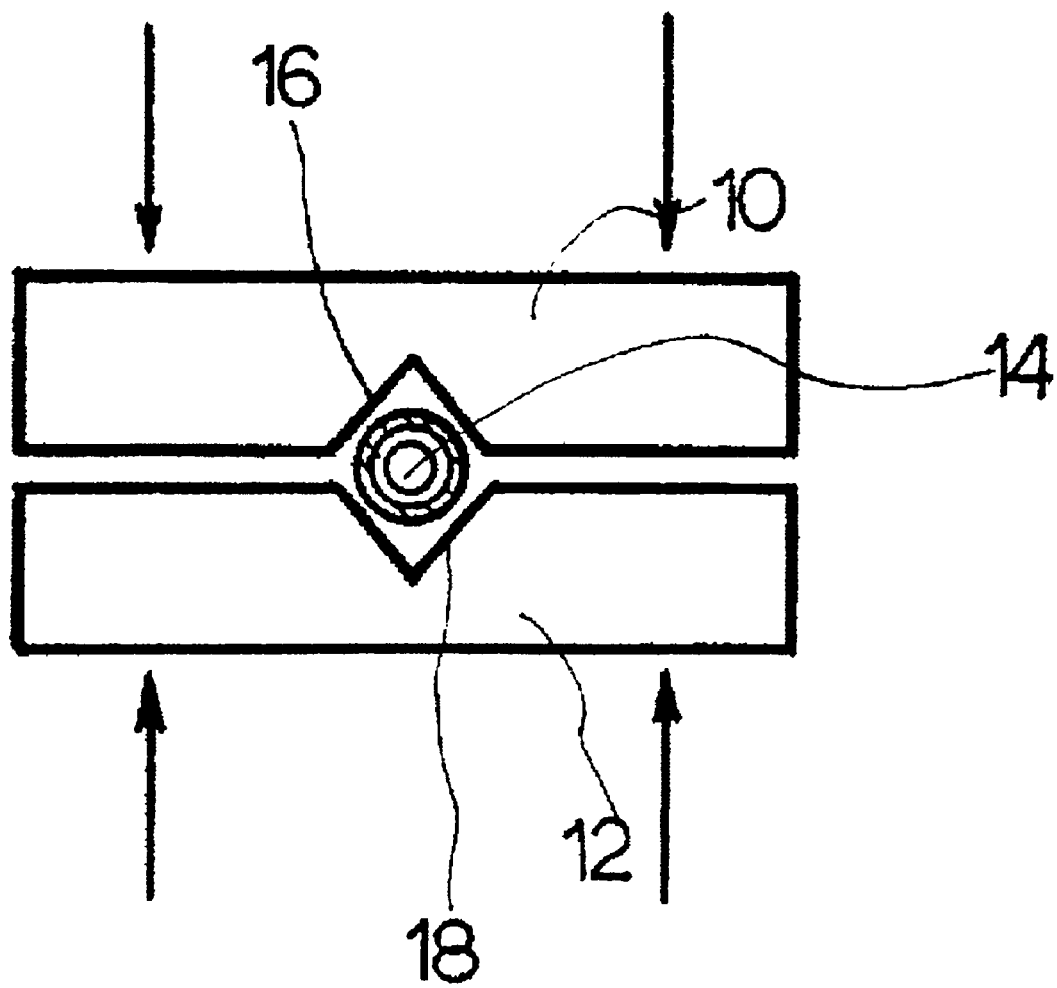
FIG. 1 is a frontal view of a conventional optical fiber fixing structure in which a singe fiber is aligned by means of a boot.
Figure 2:
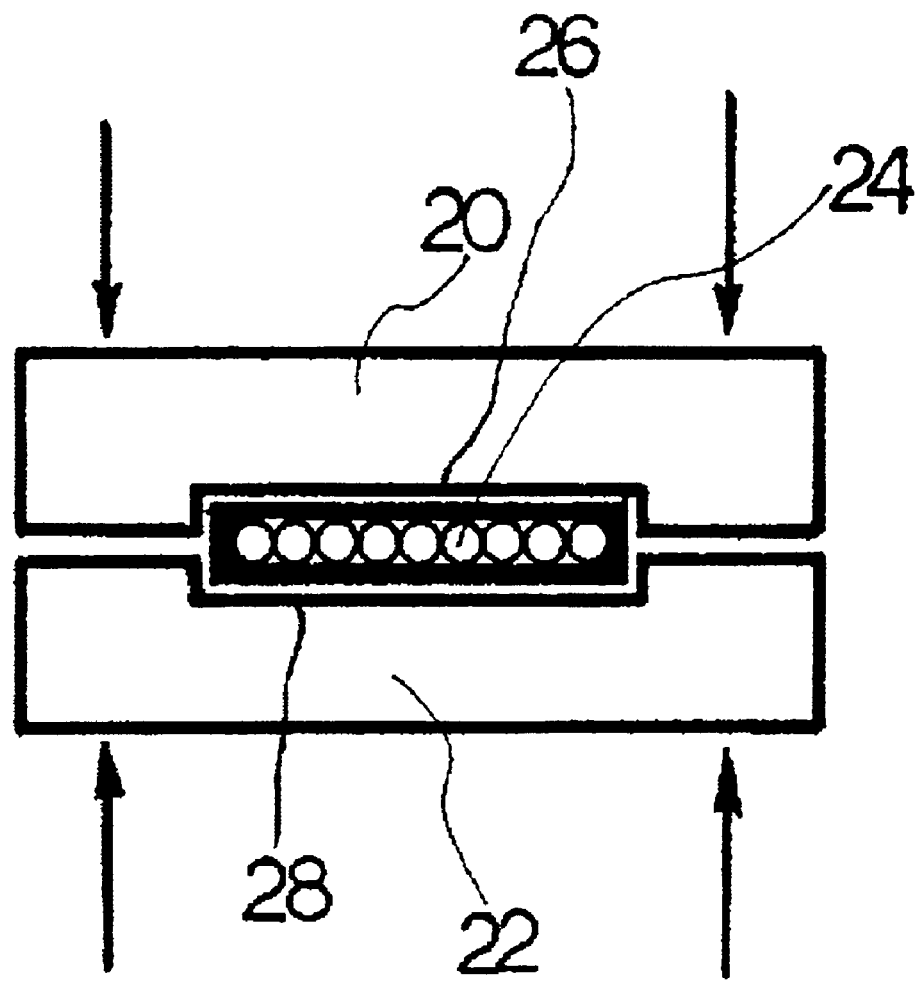
FIG. 2 is a frontal view of the conventional optical fiber fixing structure in which a ribbon fiber is aligned by means of a boot.
Figure 3:
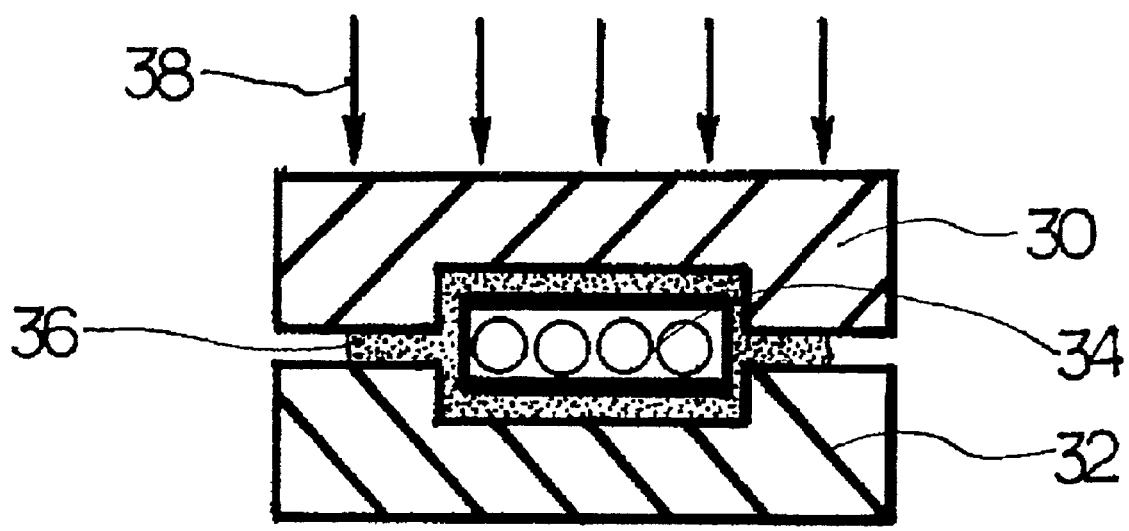
FIG. 3 is a frontal sectional view of another conventional optical fiber fixing structure in which a ribbon fiber is aligned by means of a boot and a UV-curable epoxy resin.
Figure 4:
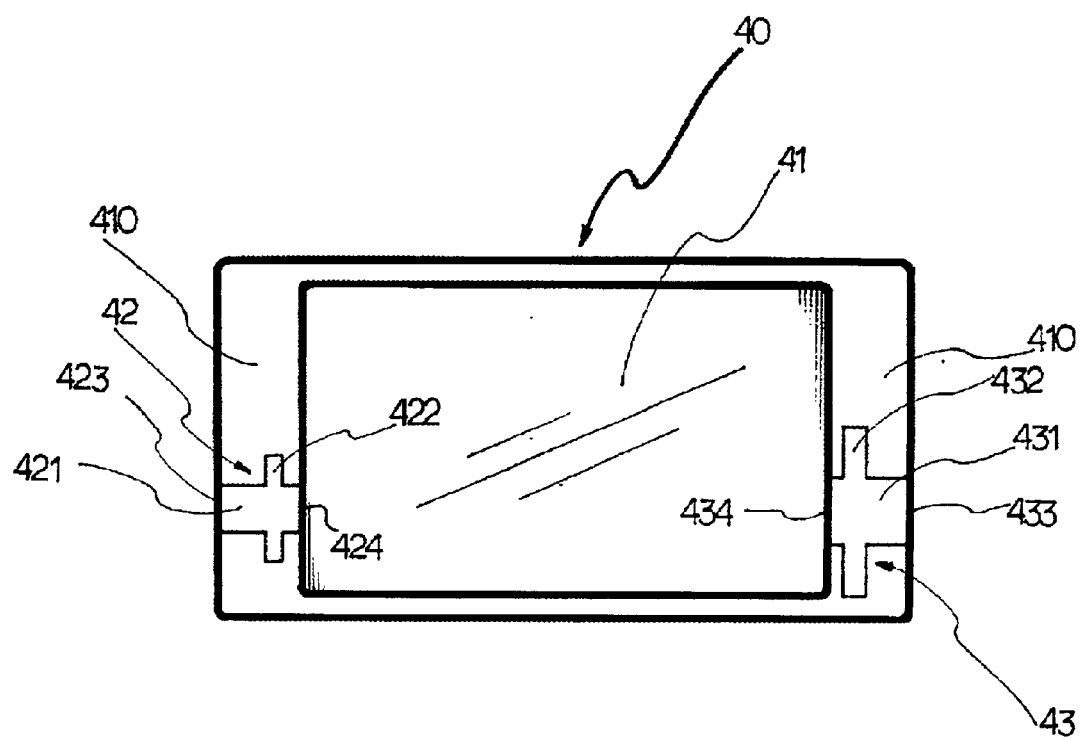
FIG. 4 is a plan view of a housing for an optical fiber array according to a preferred embodiment of the present invention.
Figure 5:
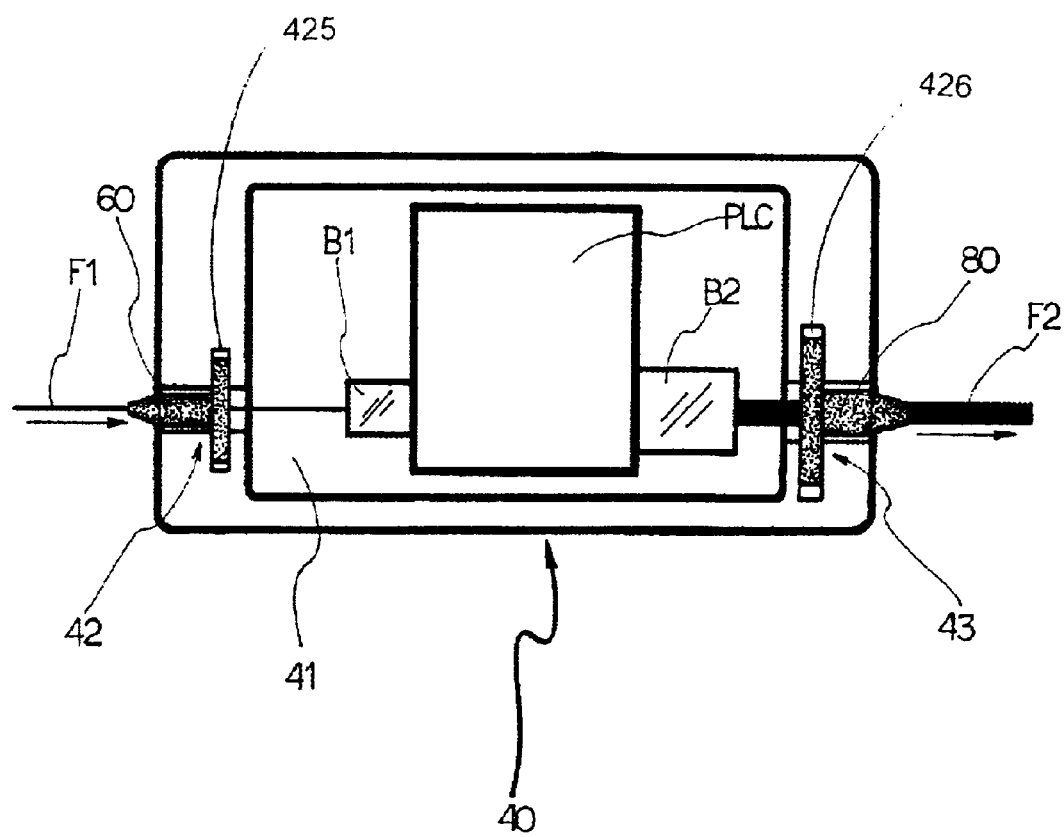
FIG. 5 is a plan view of the optical fiber array fixed within the housing according to the preferred embodiment of the present invention.

FIG. 4 is a plan view of a housing 40 for an optical fiber array according to an embodiment of the present invention. FIG. 5 is a plan view of the housing 40 within which a boot 60 for a single fiber and a boot 80 for a ribbon fiber are combined.

As shown in FIGS. 4 and 5, an optical fiber array and boots 60,80 for supporting fibers in the optical fiber array are received in the housing 40. While the housing is divided into two symmetrical upper and lower housing parts according to this embodiment of the present invention, only the lower housing part is shown as the housing 40 for clarity of description. The upper housing part (not shown) is of the same in constitution as the lower housing part and the upper and lower housing parts are combined rotatably by a hinge, which is well known and thus will not described herein. Hereinafter, the lower housing part will be referred to as the housing.

The housing 40 has a recess 41 at the center in which a PLC chip is to be fixed. First and second slots 42 and 43 are provided to face each other on the side periphery 410 of the recess 41 in order to mount fixedly the single fiber boot 60 and the ribbon fiber boot 80. The single fiber boot 60 and the ribbon fiber boot 80 are inserted in the first and second slots 42 and 43. Therefore, the shape of the first slot 42 corresponds to the shape as that of the boot 60, and the shape of the second slot 43 corresponds to the shape of the boot 80, so that each slot receives its respective boot.

The first slot 42 includes a first portion 421 in which the body of the single fiber boot 60 is to be mounted and a second portion 422 in which the engaging portion 425 of the single fiber boot 60 is to be mounted. Open ends 423 and 424 are provided in the inner and outer walls of the housing so that the walls communicate with each other. The second slot 43 includes a first portion 431 in which the body of the ribbon fiber boot 80 is to be mounted and a second portion 432 in which the engaging portion 426 of the ribbon fiber boot 80 is to be mounted. Open ends 433 and 434 are provided in the inner and outer walls of the housing so that the walls communicate with each other.

An adhesive (not shown so as not obscure the illustration of FIG. 5) can be used to secure the respective engaging portions 425, 426 shown in FIG. 5, and can be used to adhere the boots 60,80 in place as well Referring to FIG. 5, an optical fiber array is affixed in the recess 41 of the housing 40, the optical fiber array being an optical device that multiplexes an input optical signal into a plurality of channels. Hence, a single optical fiber F1 is input on an input side to the optical fiber array, and an optical ribbon fiber F2 is output on an output side from the optical fiber array. After a plurality of optical signals are input to the single fiber F1, the PLC multiplexes them and each signal is output through each optical fiber of the ribbon fiber F2. However, it should be understood that while the use of an adhesive is recommended, it is not an absolute requirement.

The optical fiber array includes a PLC chip, and an input fiber block B1 and an output fiber block B2 at both sides of the PLC chip, which connect the optical fibers F1 and F2 to the waveguide. This optical fiber array is mounted in the recess 41 of the housing 40 and the single fiber boot 60 and the ribbon fiber boot 80 are inserted in the slots 42 and 43, respectively. A cylindrical body 601 and an engaging portion 602 of the single fiber boot 60 are positioned within the housing, whereas a conical portion of the boot 60 is outside the housing 40. A planar portion 801 and an engaging portion 802 of the ribbon fiber boot 80 are within the housing 40, while a tapered portion 803 of the boot 80 is outside the housing 40.

Figure 6:
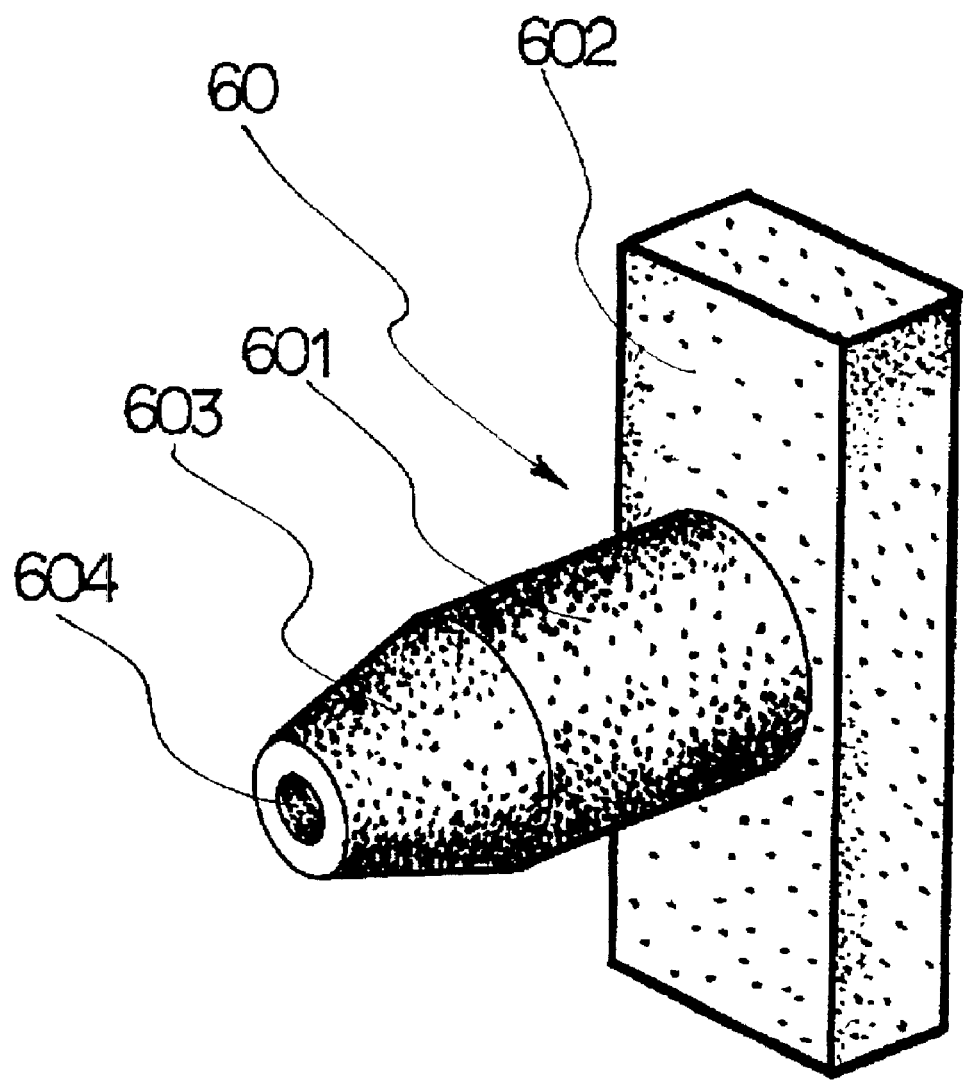
FIG. 6 is a perspective view of a boot for a single fiber to be combined with the housing according to the preferred embodiment of the present invention.
Figure 7:
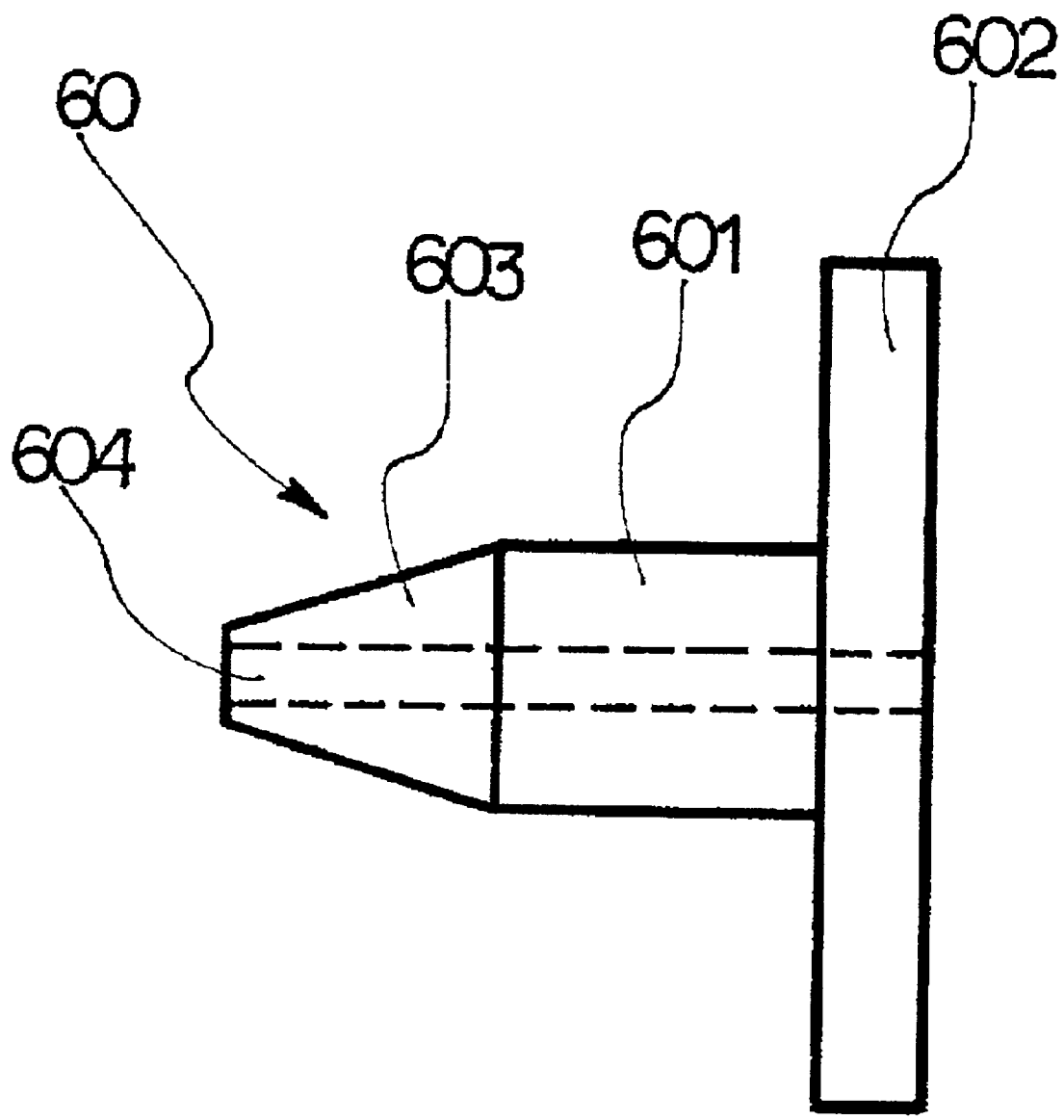
FIG. 7 is a side view of the boot shown in FIG. 6.

Referring to FIGS. 6 and 7, the single fiber boot 60 has a body extended lengthwise, an opening 604 formed along the center of the body, through which a single fiber is to be inserted, and the engaging portion 602 extended in opposing directions with respect to the body. The body is divided into the cylindrical portion 601 and the conical portion 603. The cylindrical portion 601 is within the housing 40 and the conical portion 603 is outside the housing 40.

Figure 8:
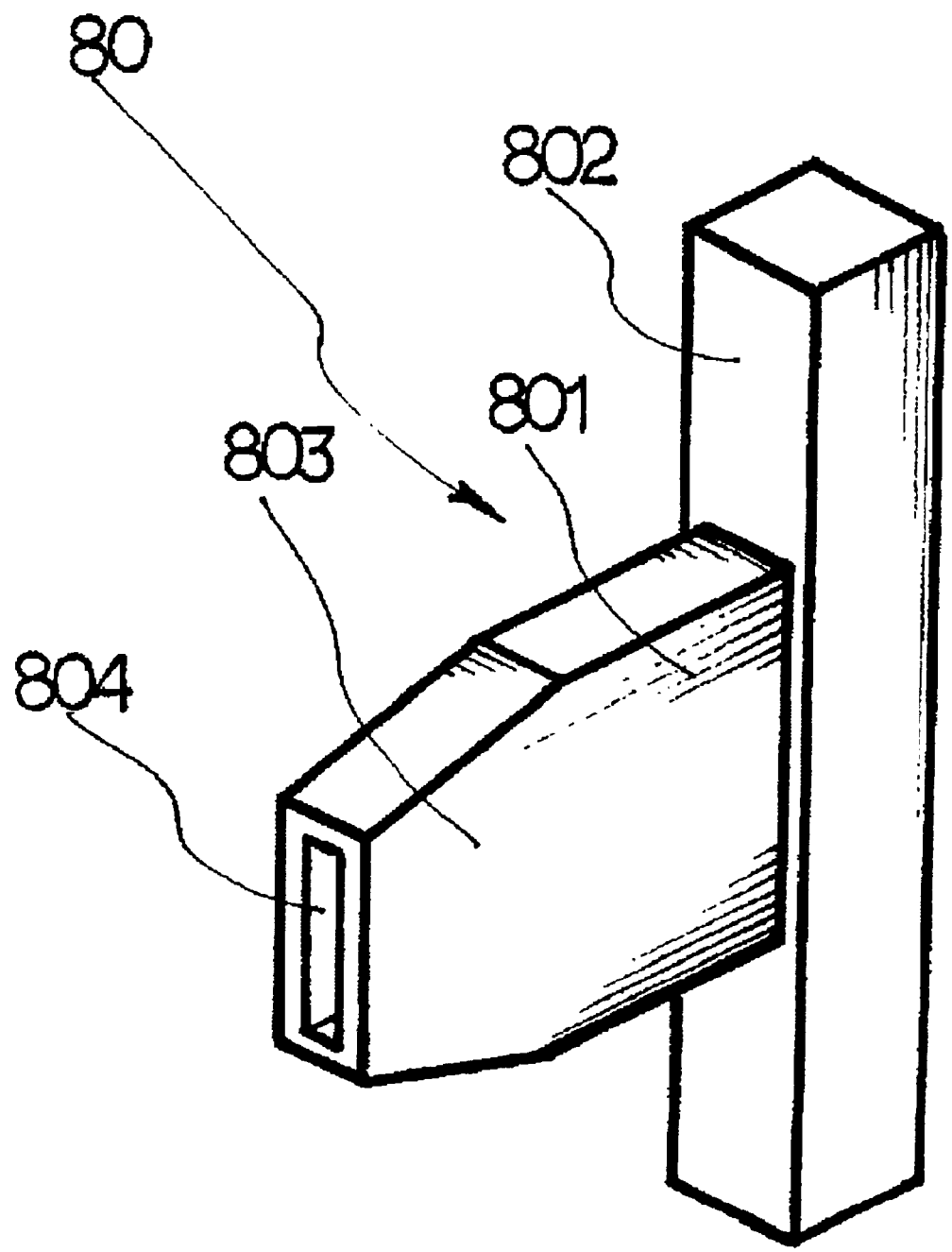
FIG. 8 is a perspective view of a boot for a ribbon fiber to be combined with the housing according to the preferred embodiment of the present invention.
Figure 9:
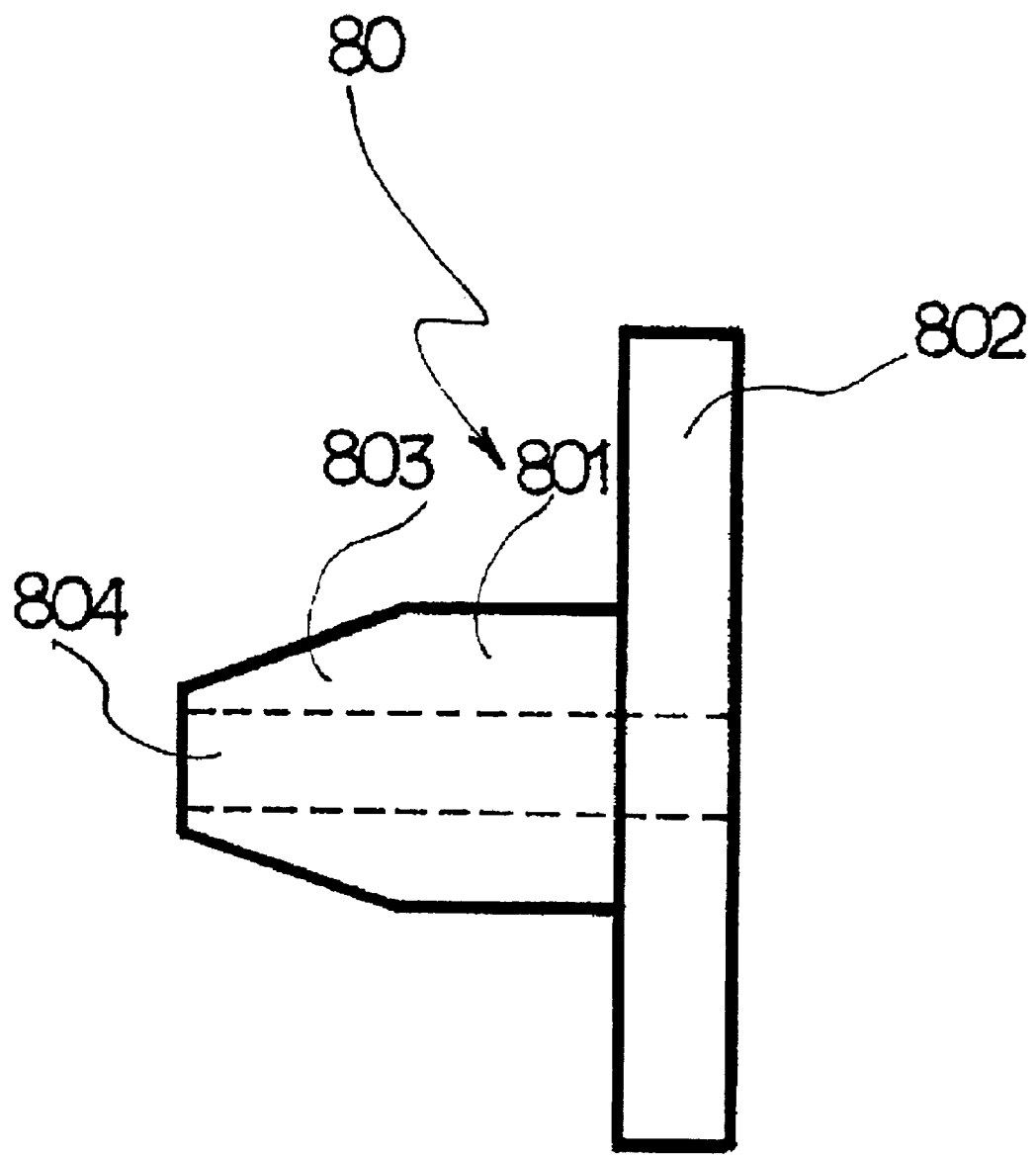
FIG. 9 is a side view of the boot shown in FIG. 7.

Referring to FIGS. 8 and 9, the ribbon fiber boot 80 has a body extended lengthwise, an opening 804 formed along the center of the body, through which a ribbon fiber is to be inserted, and the engaging portion 802 extended in opposing directions with respect to the body. The body is divided into the planar portion 801 and the tapered portion 803 extended from the planar portion 801. The planar portion 801 is within the housing 40 and the tapered portion 803 is outside the housing 40.

Packaging of the optical fiber array in the housing 40 will be described below referring to FIG. 5. For manufacture of the optical fiber array, the single fiber F1 and the ribbon fiber F2 are first inserted into the single fiber boot 60 and the ribbon fiber boot 80, respectively. The input fiber block B1 and the output fiber block B2 are arranged at both sides of the PLC and fixed by means of an adhesive.

The PLC and the input and output fiber blocks B1 and B2 are then placed within the housing 40 and the single fiber boot 60 and the ribbon fiber boot 80 are inserted in the slots 42 and 43, respectively. Subsequently, the optical fiber array, especially the PLC and the input and output fiber blocks B1 and B2 are fixed in the housing 40 with an adhesive. If the adhesive is an epoxy resin, it is cured by heat or UV light to seal the optical fiber array. Thus, the packaging is completed.

In the case of an optical communication module requiring temperature control, the housing may include a heat source, a sensor, and other necessary parts.

As described above, the present invention protects an optical fiber array from damage caused by pressure applied to the upper and lower parts of a boot and simplifies an assembly process, thereby saving cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A packaging unit for an optical fiber array having a planar lightwave circuit (PLC), comprising:
   an optical fiber array;
   a housing having peripheral sides with inner and outer side walls, said optical fiber array being fixed in said housing, and said housing having first and second slots formed on respective peripheral sides so as to face each other, each of the first and second slots having open ends so that the inner and outer side walls of the housing are in communication with each other; and
   first and second boots inserted in the first and second slots, respectively, wherein an optical fiber of the optical fiber array is inserted through the first and second boots, to fix the optical fiber lengthwise, and
   wherein the second boot is sized to receive a ribbon optical fiber, the second boot having a planar portion secured in the second slot, a tapered portion extended from the planar portion and positioned outside the housing, an opening formed alone the center of the planar and tapered portions in the length direction, for receiving the ribbon fiber, and an engaging portion extended perpendicularly from the planar portion.

2. A packaging unit for an optical fiber array having a planar lightwave circuit (PLC), comprising:
   an optical fiber array;
   a housing having peripheral sides with inner and outer side walls, said optical fiber array being fixed in said housing, and said housing having first and second slots formed on respective peripheral sides so as to face each other, each of the first and second slots having open ends so that the inner and outer side walls of the housing are in communication with each other; and
   first and second boots inserted in the first and second slots, respectively, wherein an optical fiber of the optical fiber array is inserted through the first and second boots, to fix the optical fiber lengthwise, and
   wherein the first boot is sized to receive a single optical fiber and has a cylindrical portion secured in the first slot, a conical portion extended from the cylindrical portion and positioned outside the housing, an opening formed along the center of the cylindrical and conical portions in the length direction, for receiving the single fiber, and an engaging portion extended perpendicularly from the cylindrical portion.

3. The packaging unit according to claim 1, wherein the optical fiber array includes a Planar Lightwave Circuitry (PLC) chip, and an input fiber block at an input side of the PLC chip, and an output fiber block at an output side of the PLC chip.

4. The packaging unit according to claim 1, wherein the optical fiber array is fixed in the housing with an adhesive.

5. The packaging unit according to claim 1, wherein the first and second slots are sized to retain the first and second boots.

6. The packaging unit according to claim 1, wherein the first and second boots have respective engaging portions, each respective engaging portion being arranged substantially perpendicular to a lengthwise direction of the respective first and second boots.

7. The packaging unit according to claim 6, wherein the respective first and second slots each have a portion substantially perpendicular to a lengthwise direction of the first and second boots to receive the respective engaging portion of the respective first and second boots.

8. A packaging unit for holding an optical fiber array, said packaging unit comprising:
   a housing having peripheral sides with inner and outer side walls so as to hold the optical fiber array in said housing, and said housing having first and second slots formed on respective peripheral sides so as to face each other, each of the first and second slots having open ends so that the inner and outer side walls of the housing are in communication with each other; and
   first and second boots inserted in the first and second slots, respectively, wherein an optical fiber is inserted through the first and second boots, to fix the optical fiber lengthwise, wherein the first boot is sized to receive a single optical fiber and has a cylindrical portion secured in the first slot, a conical portion extended from the cylindrical portion and positioned outside the housing, an opening formed along the center of the cylindrical and conical portions in the length direction, for receiving the single fiber, and an engaging portion extended perpendicularly from the cylindrical portion.

9. The packaging unit of claim 8, wherein the second boot is sized to receive a ribbon optical fiber, the second boot having a planar portion secured in the second slot, a tapered portion extended from the planar portion and positioned outside the housing, an opening formed along the center of the planar and tapered portions in the length direction, for receiving the ribbon fiber, and an engaging portion extended perpendicularly from the planar portion.

10. The packaging unit according to claim 8, wherein the first boot is sized to receive no more than a single optical fiber.

11. The packaging unit according to claim 8, wherein the first and second boots are affixed in their respective slots with an adhesive.

12. The packaging unit according to claim 8, wherein the first and second slots are sized to retain the first and second boots.

13. The packaging unit according to claim 8, wherein the first and second boots have respective engaging portions, each respective engaging portion being arranged substantially perpendicular to a lengthwise direction of the respective first and second boots.

14. The packaging unit according to claim 13, wherein the respective first and second slots each have a portion substantially perpendicular to a lengthwise direction of the first and second boots to receive the respective engaging portion of the respective first and second boots.

15. A method for housing an optical fiber array in a packaging unit, said method comprising the steps of:

(a) forming a housing having peripheral sides with inner and outer side walls so as to hold the optical fiber array in said housing, and said housing having first and second slots formed on respective peripheral sides so as to face each other, each of the first and second slots having open ends so that the inner and outer side walls of the housing are in communication with each other;

(b) arranging an optical fiber array in said housing; and (c) inserting the first and second boots in the first and second slots, respectively, wherein an optical fiber is inserted through the first and second boots, to fix the optical fiber lengthwise, wherein the first boot is sized to receive a single optical fiber and has a cylindrical portion secured in the first slot, a conical portion extended from the cylindrical portion and positioned outside the housing, an opening formed along the center of the cylindrical and conical portions in the length direction, for receiving the single fiber, and an engaging portion extended perpendicularly from the cylindrical portion.

16. The packaging unit according to claim 1, wherein the first and second boots are affixed in their respective slots with an adhesive.

17. The method according to claim 15, wherein, the first and second boots are affixed in their respective slots with an adhesive.

* * * * *